(12) United States Patent
Harris

(10) Patent No.: US 8,213,910 B2
(45) Date of Patent: Jul. 3, 2012

(54) TELEPHONE USING A CONNECTION NETWORK FOR PROCESSING DATA REMOTELY FROM THE TELEPHONE

(75) Inventor: Scott C. Harris, Rancho Sante Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 1225 days.

(21) Appl. No.: 09/683,600

(22) Filed: Jan. 24, 2002

(65) Prior Publication Data

US 2009/0104898 A1 Apr. 23, 2009

Related U.S. Application Data

(60) Provisional application No. 60/267,635, filed on Feb. 9, 2001.

(51) Int. Cl.
*H04M 3/42* (2006.01)
(52) U.S. Cl. .................................................. 455/414.1
(58) Field of Classification Search .............. 455/414.1, 455/426.1, 426.2, 445, 456.1, 411, 518, 563, 455/41.2; 370/350–354; 379/102.01–106.09, 379/88.02
See application file for complete search history.

(56) References Cited

U.S. PATENT DOCUMENTS

| | | | | |
|---|---|---|---|---|
| 5,930,700 A | * | 7/1999 | Pepper et al. | 455/435.3 |
| 6,018,668 A | * | 1/2000 | Schmidt | 455/518 |
| 6,122,614 A | * | 9/2000 | Kahn et al. | 704/235 |
| 6,219,407 B1 | * | 4/2001 | Kanevsky et al. | 379/88.02 |
| 6,385,586 B1 | * | 5/2002 | Dietz | 704/277 |
| 6,493,550 B1 | * | 12/2002 | Raith | 455/422.1 |
| 6,526,581 B1 | * | 2/2003 | Edson | 725/74 |
| 6,546,002 B1 | * | 4/2003 | Kim | 370/351 |
| 6,563,911 B2 | * | 5/2003 | Mahoney | 379/88.03 |
| 6,668,044 B1 | * | 12/2003 | Schwartz et al. | 379/68 |
| 6,711,138 B1 | * | 3/2004 | Pai et al. | 370/257 |
| 6,775,264 B1 | * | 8/2004 | Kurganov | 370/352 |
| 6,775,651 B1 | * | 8/2004 | Lewis et al. | 704/235 |
| 6,801,928 B2 | * | 10/2004 | Nuestro | 709/203 |
| 6,901,270 B1 | * | 5/2005 | Beach | 455/563 |
| 6,965,925 B1 | * | 11/2005 | Shank et al. | 709/219 |
| 7,103,348 B1 | * | 9/2006 | Levit et al. | 455/412.1 |
| 7,142,846 B1 | * | 11/2006 | Henderson | 455/417 |
| 2002/0077084 A1 | * | 6/2002 | Zellner et al. | 455/414 |
| 2002/0077139 A1 | * | 6/2002 | Bouet | 455/522 |
| 2002/0102969 A1 | * | 8/2002 | Enns et al. | 455/414 |
| 2002/0152202 A1 | * | 10/2002 | Perro et al. | 707/3 |
| 2007/0174046 A1 | * | 7/2007 | Stanford | 704/201 |

* cited by examiner

*Primary Examiner* — Blane J Jackson
(74) *Attorney, Agent, or Firm* — Law Office of Scott C. Harris, Inc.

(57) ABSTRACT

A system of connection between computers. First and second computers are connected over a network. The network preferably uses an existing channel, such as a wireless connection or a telephone line. The first computer may be a PDA or a cell phone. One aspect may take speech into the telephone, send it over the network connection to the second computer, where it is recognized, and return the recognized speech to the first computer.

2 Claims, 5 Drawing Sheets

TELEPHONE USING A CONNECTION NETWORK FOR PROCESSING DATA REMOTELY FROM THE TELEPHONE

CROSS REFERENCE TO RELATED APPLICATIONS

This application claims priority to U.S. Provisional Ser. No. 60/267,635, filed Feb. 9, 2001

BACKGROUND OF INVENTION

Many applications, which were once thought to be nothing but science fiction, are now available on reasonably powerful computers. For example, speaker independent voice recognition can be run on a computer which has a sufficiently large processing capability, and in fact is being used by some companies for certain telephone applications. The computer running the recognition often uses a database of templates to match incoming words to their recognized counterparts. Algorithms for recognizing such information on a speaker independent basis have improved over time. However, significant computer resources are still needed to carry this out.

A trend in the art has been to make computers smaller and "thinner", e.g. to reduce the computing power. This is often done in small computers such as a personal digital assistant (PDA) or a portable telephone or a cell phone or a miniaturized computer. In today's world, many of the high resource-intensive applications, such as speaker independent voice recognition, cannot be effectively run on a thin computer such as a personal digital assistant. The hardware necessarily to do this effectively will undoubtedly get smaller and cheaper. Therefore, smaller computers may be able to do these functions in the future. However, by that time, more applications, with more computation-intensive needs, will be available.

No matter what happens, it is believed by the inventor of the present invention that there will always be applications that need to be run on a desktop computer that cannot be properly run on a thin client such as a PDA.

Perhaps the ultimate thin client is one which only allows sending commands to another more robust server, and does not itself have any computing power.

SUMMARY OF INVENTION

The present application teaches a system for connecting a thin client, such as a PDA or cell phone, to a server which has additional resources, and which can carry out certain operations for processing telephone operations. The connection may be done over an existing channel that exists between the client and server. The existing channel allows communication between the client and the server. The server may process information, and carry out some operation that is used and/or communicated to the client.

In one specific embodiment, the system connects to all telephones in an area, and controls both the ringing of the phones and the off-hook state of the phones. The server can therefore make decisions, based on user criteria, about which calls should ring in the area on the client phones, and/or be answered.

In another aspect, voice recognition on a phone or PDA is carried out, by obtaining the voice at the phone/PDA, sending digital information to the server, recognizing the voice and sending results back to the client.

BRIEF DESCRIPTION OF DRAWINGS

These and other aspects will now be described in detail with reference to the accompanying drawings, wherein.

DETAILED DESCRIPTION

Figure 1:
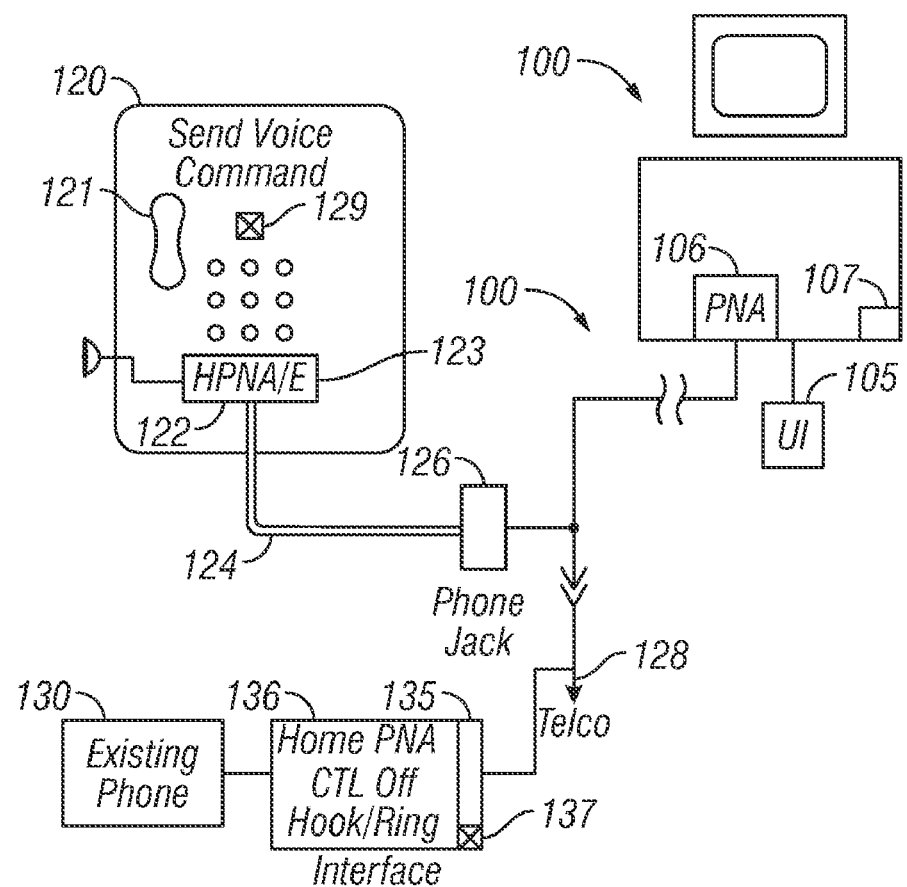
FIG. 1 shows a block diagram of an embodiment.

A block diagram of an embodiment is shown in FIG. 1. A computer 100 is located on a network whose connection is shown generically as 110. Throughout this disclosure, the connection will be assumed to be over a telephone line using standard phone line networking protocols, i.e. a home PNA connection. Home PNA connections use the same telephone line that carries phone type communication, to also carry network traffic. The network information is transmitted at either 1 Mbps with the first generation of home PNA or 10 megabits with the second generation. The protocol is backwards compatible, so that 1 megabit format information can be transmitted using the 10 megabit hardware. Future generations are being considered. While homePNA is contemplated, other network formats can also be used. A network format is preferred which uses an existing channel, and even more preferably, a wired channel. Home may be useful since this allows the computer to be connected to the phone line, which is the same phone line that the telephones are connected to. However, wireless LAN in its various flavors also does not require a dedicated connection. In addition, Bluetooth™ can be used and may be preferred when a PDA is the thin client. The information can also be sent over a power line network in any of its various flavors, including using X10 format or any of the Power Line network protocols. In another embodiment, the phone can also transmit its commands and receive its answers via standard wired Ethernet.

This system also has advantages since it allows use of hardware which might be otherwise obsolete. For example, 1 Mbps home PNA hardware might not be preferred by computer users, since faster hardware may be available. However, the slower hardware may be fine for placing in telephones such as 120, and interface elements such as 135. The data rate of these devices may be relatively low and therefore the old hardware, which may be otherwise difficult to sell, may find a new use.

The computer 100 includes a user interface 105 which allows communication with the computer, and also includes the home PNA hardware shown as 106. Two different telephone handsets are also shown labeled as 120 and 130.

The telephone handset 120 is a special handset which has home PNA hardware 122 built in. The home PNA hardware connects to the phone line, via connection 124 connected to phone jack 126. Again, the phone line 110 serves as the network connection, and also as the phone line. The telephone 120 also may include some dedicated connection requests such as 129. Element 129 requests sending a VoiceCommand, and other functions which are dedicated to the network connection may also have their own button.

An existing phone 130 may be a telephone which does not include the built in home PNA capability. This existing telephone is connected to an interface 135. The interface 135 includes home PNA hardware 136 as well as a dedicated VoiceCommand button 137. The interface may also include a ringer circuit shown as 123 which may generate the signal, e.g. the 50 V peak to peak signal, necessary to operate the ringer of its associated phone.

The interface is preferably placed in series between the existing phone 130 and the telephone line 110.

The operation of this structure is described with reference to the flowchart of FIG. 2 and the other flowcharts.

Figure 2:
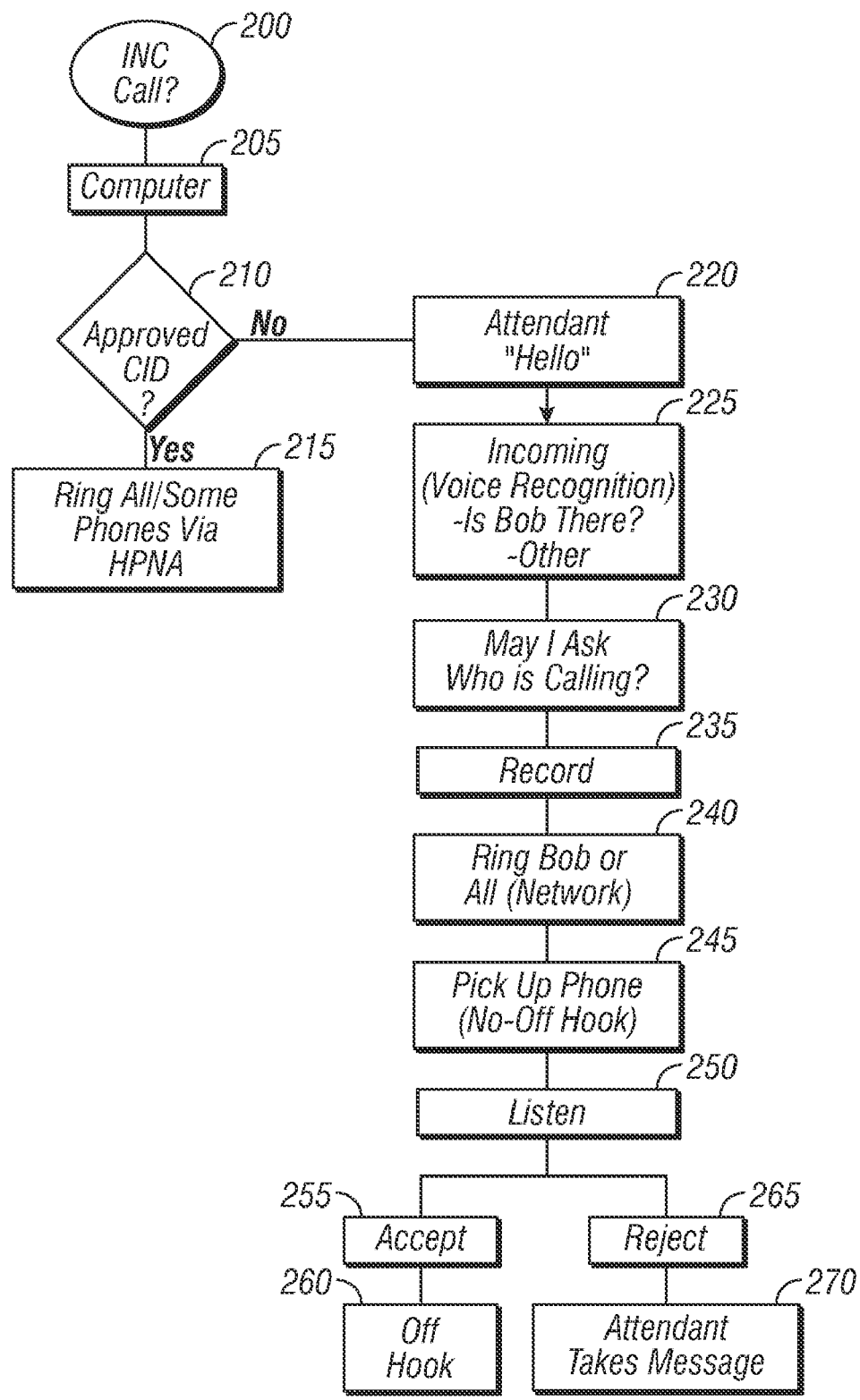
FIG. 2 shows a flowchart of operation of the first embodiment.
Figure 3:
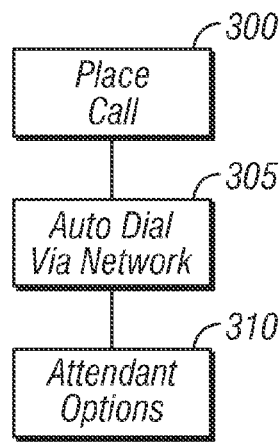
FIG. 3 shows a block diagram of operation of the second embodiment, for use with an automated attendant at both ends.

FIG. 2 shows the operation for an incoming call beginning at 200. The incoming call is signaled by a signal on the telephone line 110 which is connected to the computer. The computer detects the incoming call at 205. Note that the telephones in this system are each controlled by the network hardware. A telephone is only allowed to ring if it receives a signal from the computer telling it to ring. Otherwise, the telephones do not ring when an incoming ring tone is received on the phone line. The existing phones, which do not have this capability, are controlled by the interface. Hence, unlike a conventional phone which rings any time it receives a signal, these phones are controlled to only ring when they are commanded to ring over the home PNA connection; and do not ring based directly on the ring caused by an incoming call.

The caller ID on the incoming call is tested at 210. The computer stores a list of approved caller IDs, and compares the incoming caller ID against that list. If the caller ID is on the list, or otherwise noted as approved, the telephones are commanded to ring at 215. Each phone may be individually addressed. Therefore, certain phones are commanded to ring. If the caller ID is from a friend of person A in the family, then only person A's phone might ring. Alternatively, all phones may be caused to ring for all caller ID's so that anyone in the house can answer. The phones can include multiple ring tones, one for each user in the house, so that all users may be able to determine the probable caller from the ring tone. All phones may ring, or just some phones with the unique ring tone.

A list of caller Ids can be manually entered, or iteratively entered. An iterative entry might use a dedicated button on the phone, labeled "add to accepted Callers", or the like.

The computer 100 may also store the user's personal information manager, including a contact list. The list includes names and phone numbers, and each name may be annotated with an indication of whether calls from that person should be accepted or not. Alternatively, only calls from people on the list might be accepted if there is no indication of whether to accept calls from specific people.

The database of personal information that is stored can be a synchronization of information from a PDA, such as a Palm™ computer, for instance.

Manual entry requires starting the program, and adding the caller ID to a list.

The Caller Ids can also be learned, for example using a rules database indicating that when users answer the phone in a certain way, that the caller ID should be accepted, otherwise not. Again, since the caller ID is processed in the computer 100, can be handled with a fair amount of processing power.

If the call is not an approved caller ID, or caller ID is blocked, or if an option in the program is appropriately set, then an automated attendant will automatically answer the phone. The automated attendant is resident in software running on the computer 100. The attendant uses voice synthesis technology to synthesize its voice, and uses speaker independent voice recognition technology to analyze the results.

At 220, the attendant answers with a voice. The attendant then monitors the line for incoming information. An override code can also be entered at this point. The override code may be known to family members or friends, and can be used when they are either calling from an unfamiliar phone (e.g. a pay phone), or from a caller ID blocked phone. The override code can be, for example, a 4 digit code entered via DTMF. This automatically bypasses the rest of the process and causes phones to ring.

Other than the override code, the incoming information will typically reduce to a relatively small set of responses. For example, the incoming information may say "hello, is Bob there?" or other similar introductory responses. However, the attendant does not need to be able to recognize the entire spectrum of English language. The attendant then answers at 230 with a "Who may I say is calling?", and waits for a response. The name is recorded at 235 and the system attempts to recognize it.

The user's personal information may be stored in the computer 100, so the computer can use its limited vocabulary, and the names stored in the computer. With names not on the list, the system might just do the best it can to recognize the name. Note that all of this is being carried out on the computer 100. At this point, the telephones have not yet rung.

At this point, the computer sends a signal over the network connection to Bob's phone 120. Alternatively, depending on settings, the system may ring all the phones over the network. Bob or someone else picks up the phone at 245. The computer, not the act of picking up the phone, controls the off hook condition of the phone via the network connection. When Bob picks up the phone, a network connection is established between Bob at 120 and the computer 100 over the phone line. The phone does not go off hook, but rather information is sent across the phone line 110 to the network circuit 122 and to the handset 121 of the phone 120. Alternatively, a display on the phone can display the same information. The information is provided to Bob about who is calling. Bob listens or sees the display at 250, and decides to either accept or reject the caller.

Bob can either accept or reject the call using buttons on the phone, or using voice commands.

If Bob accepts the caller at 255, then the computer commands the phone to go off hook at 260, immediately connecting Bob to the caller. The phone is then connected directly to the telco 128. The caller id can be processed according to the rules in the rules database, e.g., added to acceptable caller Ids, or only added to acceptable caller Ids if the call lasts more than 5 minutes.

If a reject signal is sent at 265, then the off hook signal is never placed, and the attendant takes a message at 270.

This system can also be used to place a call. At 300, the user requests a call to be placed. The user can press, for example, the "voice command" button 129. The words "call Jane" are sent from the handset 121, via the network circuit 122 over the phone line 110 to the computer. They may be sent as a ".wav" file for example.

The computer receives the Voice Command and automatically recognizes it. A limited set of commands may be defined. For it example, one command may include "call". This command set may call the person whose name comes after the command.

When the computer receives a command of "call Jane Smith", it parses the words into a command to call a person named Jane Smith. More options can also be provided, e.g., "mobile", "home", etc.

The computer automatically searches through the personal contact list to look for a match to the person named Jane Smith. If such a match is found, and there is no ambiguity, then the call is automatically placed via the network at 305. The call may be placed by sending a call command via network over the phone line 110 to the commanding phone, with the phone number to be dialed and a command to go off hook before dialing. Alternatively, if there is ambiguity, then the computer voice synthesizes a response. The response may say for example "should I call Jane at her home, office or mobile number?" The response is again monitored, narrowing again the options.

Once the call is placed, the user can be immediately connected to the call, or the attendant can act as a secretary at 310, to see if the call is answered, thereafter attempting to find the right person. For example, if Bob works at a location where either an automated attendant is necessary, or it is necessary to enter an extension, or calling somewhere to see if Bob is there, then the attendant can do the work, finding Bob and getting him on the line before the caller actually picks up.

Figure 5:
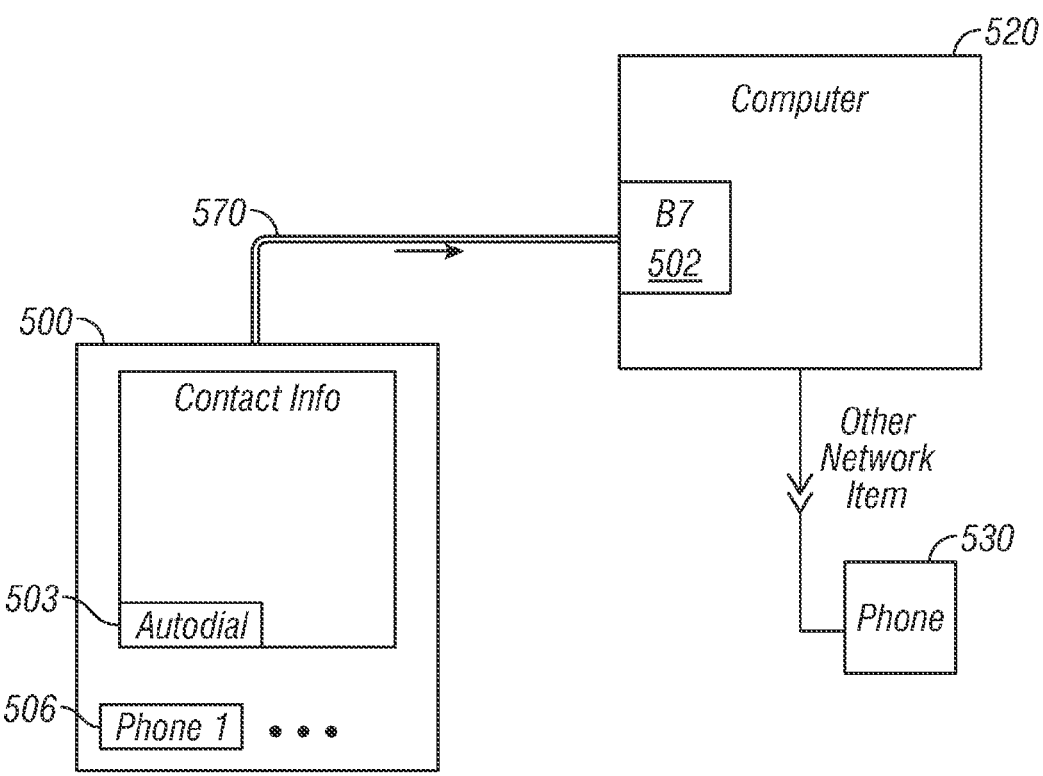
FIG. 5 shows an embodiment with a PDA connected wirelessly to a computer, which controls phones on the network.

Another operation of this system may be in an autodialer. Many personal information organizers such as outlook include the ability to automatically dial a selected number. For example, a user can select a number, and the computer dialer can automatically dial it. This limits, however, the use to phones which are connected directly to the computer. This embodiment is shown in FIG. 5. In this embodiment, any phone can become the dialing phone. In operation, the user selects auto dial from the personal information manager 500. At the time that auto dial 505 is selected, the personal information manager scans the network via connection 510, which may be a wireless connection, e.g. Bluetooth to computer 520 having a Bluetooth module 522. All the phones which are on the network answer the poll, and the system provides a display, which may be an icon form, of all the phones which are currently on the network. This is shown as 506 on the PDA 500. The user then selects one of these phones for dialing.

The computer then sends a command to that phone, requesting it to ring, or otherwise provide a display. For example, the phone may provide a short beep tone every 15 seconds. The user then picks up the phone or otherwise signifies that they have the phone. Again, picking up the phone may not automatically cause an off hook of the phone. The phone dialer then dials the number, and then commands the phone off hook so that the user is connected to their desired connection. Alternatively, the attendant can carry out some of the operations described above prior to ringing the phone so that the connection may already be established by the time the user picks up the phone.

The above has described using phoneline networking. However, other protocols could be used. It is specifically preferred that the protocol be one which uses an existing channel for its communication, as is done by phoneline networking. However, wireless Lan, Bluetooth, power line networking, and X10 can also be used in this way, just to name a few. The wireless protocols can specifically be used with portable telephones, such as cell phones and the like.

Figure 8:
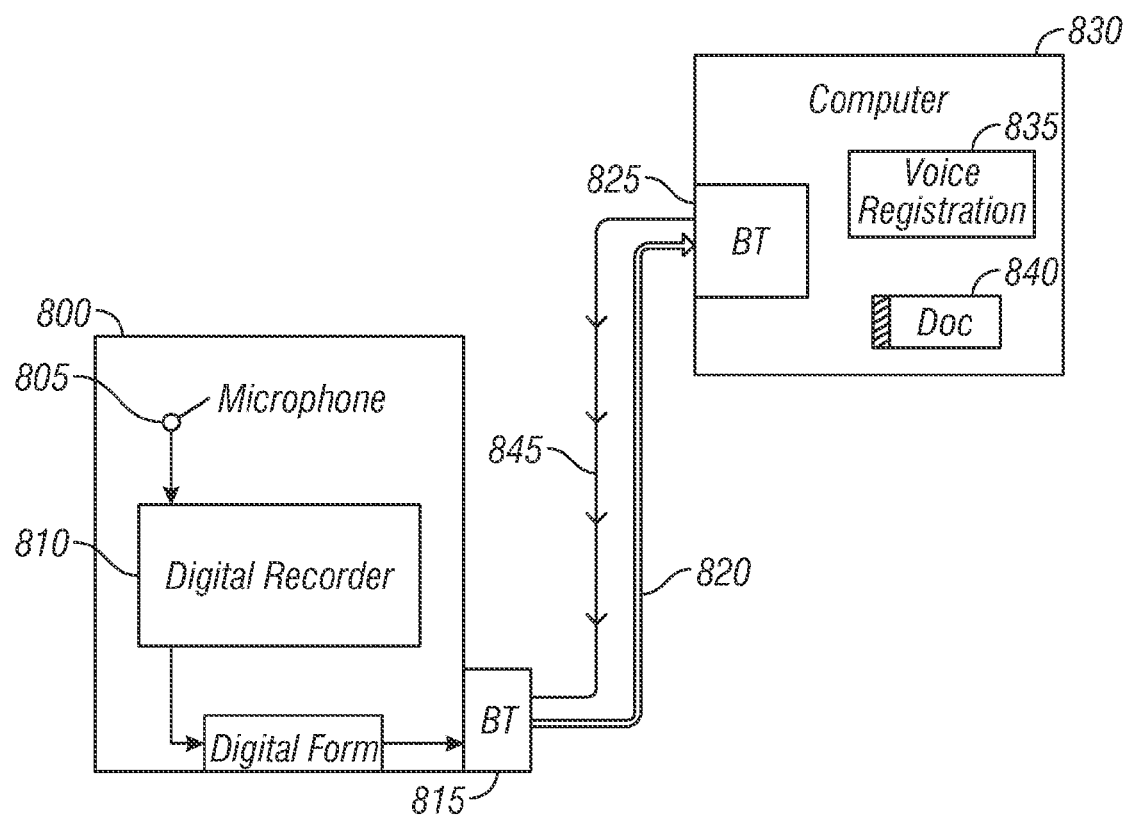
FIG. 8 shows an embodiment in which a PDA with a microphone is interface via wireless protocol with a computer which carries out voice recognition.

Another embodiment, shown in FIG. 8, uses the network connection to allow a PDA to carry out voice recognition even in view of its limited resources. The PDA 100 is shown with a built-in microphone 805, and a digital recorder or connector 810. Such PDAs are already available, for example the Compaq Ipaq™ PDA has this capability. In this embodiment, a Bluetooth module 815 (or other network module) is connected to the PDA, and receives its digital output form of the recorded voice. The Bluetooth module sends the digital version of the voice over the wireless channel 820 to a Bluetooth module 825 in the computer 830. The computer 830 runs voice recognition software 835, which can be software that has been trained by the user. The voice recognition software 835 can be, for example, Dragon Naturally Speaking™. As the voice is recognized by the recognition software 835, it produces a document shown as 840. This document is stored on the computer, and is also converted into a form for storage and display on the PDA. Specialized document forms are often used to display information on the PDA. The document information is sent back to the Bluetooth module 825, and sent over the Bluetooth line 845 which is the same channel as 820, to the Bluetooth module 815 in the PDA 800. The document is therefore displayed on the PDA. Therefore, the document is displayed in semi real time. The only extra delays for are those attributable to the digitization and Bluetooth communication, which may be minimal.

Figure 4:
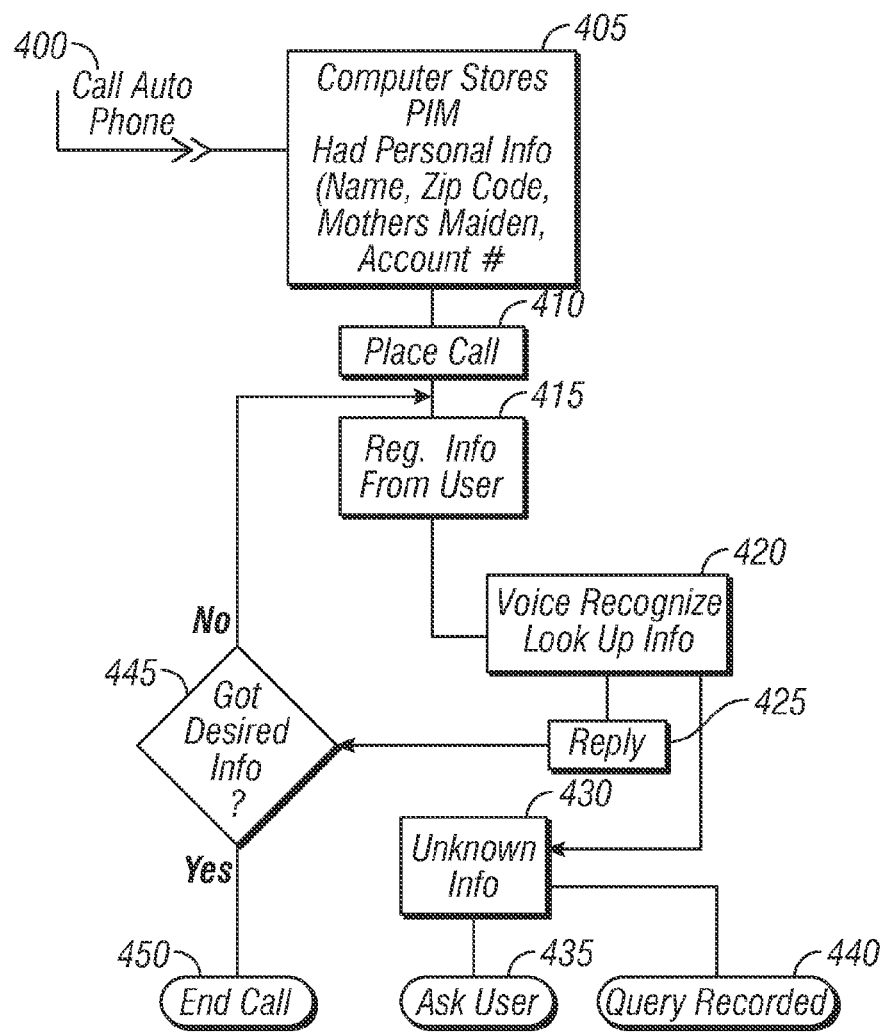
FIG. 4 shows a flowchart of automatic interface with a voice prompt system.

Another embodiment shown in FIG. 4 is directed specifically to a specialized kind of attendant. Sometimes, when one calls a large company such as a credit card company, an attendant answers the phone and often requests various personal information prior to providing its response. There are basically two embodiments of this system. A first embodiment is more of a retrofit embodiment, using existing hardware, and not requiring substantial change to the hardware or the way these systems work. A second embodiment, described with reference to FIG. 6, requires some retrofit to operate properly. However, once this system is retrofit, the operation can occur more quickly, thus minimizing the amount of time the user stays on the phone, and eventually reducing the phone bills to the company, which often pays per minute for the access via a toll free number.

Many companies use their automated attendant in order to try to provide as much information to the user as possible without requiring an actual person to speak. Many times a user is calling for something that will require only an automated attendant.

A first embodiment is shown in FIG. 4. At 400, the system has called an automated phone system, such as the kind that is maintained by a credit card or other large processor of information. The computer stores a personal information manager. This has the user's personal information including the person's name, zip code, and account number and information which is often requested, like mother's maiden name. The personal information manager presumably stores all of the conceivable information that the auto phone could possibly want to get. At 410, the call is placed, and the auto phone responds by requesting information from the user. A common initial request might be "please enter your account number". The personal information manager at 405 presumably has this information.

At 420, this system voice recognizes the query from the auto phone, using speaker-independent voice recognition. This can be done by sending the information to a main computer using the techniques described in FIGS. 1-3 and 8. After obtaining the desired information, the system replies at 425, by entering touchtone digits indicative of the looked-up information. 430 represents the situation where the system does not know the information being asked for, or cannot recognize the voice. In this case, if the user is close by, the system can ask the user at 435 in real-time and still provide a response. Otherwise, if the user has asked for this to be done off-line, then the query is recorded at 440. The recorded query at 440 will later be played to the user who can provide this information. After the reply at 425, 445 determines that the user has obtained the desired information that they want. If so, the call is ended at 450. If not, the loop may continue. For example, if the user is calling to get a credit card or bank balance, then the balance may be displayed to the user. If the user has specific questions about a transaction or about anything else, this can all be accommodated with most of the operations occurring automatically.

Figure 6:
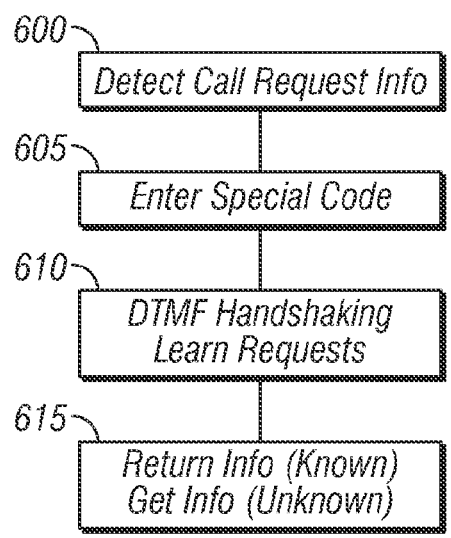
FIG. 6 shows a flowchart of operations in a mode to interact with a voice prompts system.
Figure 7:
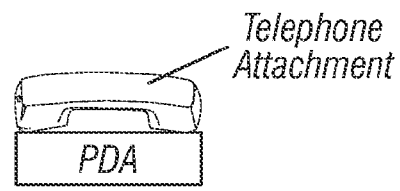
FIG. 7 shows a phone interface with a PDA.

A retrofit environment is shown in FIG. 6. This can also be carried out using a personal digital assistant as the computer as shown in FIG. 7. The phone handset may be coupled with the personal digital assistant, either using acoustic coupling as shown in FIG. 7, or simply by plugging in the modular jack. Alternatively, this intelligence can be built directly into the telephone, or can be carried out in a remote processing computer using the techniques described above. In operation, at 600, the computer detects a call that is requesting specific information. The call may be saying, for example, "welcome to your bank. This bank is system is compliant with the X. X. X. special system. Please enter the special code or your account number to proceed". At 605, the computer responds by entering a special code EG ##. Responsive to entering the special code, a series of handshaking requests occur, using DTMF communication or modem communication. The computer intelligence learns a sequence of requests and the kind of information which will be required. At 615, this system returns all of the information which it knows, i.e. that information which is stored in the personal information manager. The unknown information may be obtained from the user, either off-line or in real-time.

In either of the embodiment of FIG. 4 or 6, the user may want something special, for example to talk to a representative about some issue. The user can enter that as a comment. In the FIG. 4 embodiment, the system may request the attendant as soon as the option becomes available. If the system says "an operator will be with you in five minutes", then the system times that amount of time before asking the user to get on the line. In the FIG. 6 embodiment, the reason why the user wants to talk to an attendant can be communicated to the system at the other end in some comment form.

As described above, even though this system describes used with only certain network protocols, it can be used with other network protocols. Any protocol that does not require a separate connection to be made is preferred. Wired ethernet will require a special ethernet connection, and therefore may be less preferred in this system. However, wireless LAN may still allow a chip to be placed in the telephone which can communicate with the computer.

Moreover, while the above has described the server for this system as being a home computer, it should be understood that this server could be any other kind of client, including another phone which includes processing capability for example. One of the phones would then act as the client, which answers all calls and determines how to handle those calls as described above. The remaining phones connect to the server phone over the network.

Also, that network is preferably a network that uses existing wiring, such as a phone line network, or a power line network. However, the network can also be of other types, including Ethernet and/or wireless networks.

The invention claimed is:

1. A system, comprising:
a computer, including commands for controlling a telephone function that controls placing a telephone call,
said computer sensing a first voice command, and responsive to sensing said first voice command, accessing a contact list that is stored in said computer to determine a match in said contact list to said first voice command;
said computer detecting an ambiguity in detecting a match between said first voice command and said contact list and creating a synthesized voice response that requests information about which item in said contact list is intended to be said match;
said computer receiving a voice response responsive to said creating said synthesized voice response;
said computer including a connection to said telephone function,
wherein said computer operates to obtain recognized voice information from said voice response,
said computer storing plural different contact information for plural different contacts as part of said contact list;
wherein said computer compares said recognized voice information against said plural different contact information, and recognizes said recognized voice information to select only one contact detail among said plural different contacts, and controls automatically controlling said telephone function using said one stored contact detail obtained from recognizing the recognized voice information, wherein said telephone function further comprises an attendant on said computer for communicating with an automated attendant that answers for the selected contact.

2. A system comprising:
a computer, including commands for controlling a telephone function that controls placing a telephone call,
said computer sensing a first voice command, and responsive to sensing said first voice command, accessing a contact list that is stored in said computer to determine a match in said contact list to said first voice command;
said computer detecting an ambiguity in detecting a match between said first voice command and said contact list and creating a synthesized voice response that requests information about which item in said contact list is intended to be said match;
said computer receiving a voice response responsive to said creating said synthesized voice response;
said computer including a connection to said telephone function,
wherein said computer operates to obtain recognized voice information from said voice response,
said computer storing plural different contact information for plural different contacts as part of said contact list;
wherein said computer compares said recognized voice information against said plural different contact information, and recognizes said recognized voice information to select only one contact detail among said plural different contacts, and controls automatically controlling said telephone function using said one stored contact detail obtained from recognizing the recognized voice information, wherein said telephone function further comprises an attendant for communicating with an automated attendant by entering an extension.

* * * * *